(12) United States Patent
Waibel et al.

(10) Patent No.: US 6,604,291 B2
(45) Date of Patent: Aug. 12, 2003

(54) SELF-LEVELING DEVICE

(75) Inventors: Reinhard Waibel, Berneck (CH);
Wilfried Piske, Heerbrugg (CH);
Erwin Bünter, Eichberg (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/973,409

(22) Filed: Oct. 9, 2001

(65) Prior Publication Data

US 2002/0043000 A1 Apr. 18, 2002

(51) Int. Cl.$^7$ ................................................ G01C 15/10
(52) U.S. Cl. ........................ 33/283; 33/392; 33/291
(58) Field of Search ........................ 33/281, 282, 283, 33/285, 286, 291, 366.24, 391, 395; 324/761, 72.5, 754, 755, 158.1

(56) References Cited

U.S. PATENT DOCUMENTS

| | | | | |
|---|---|---|---|---|
| 3,722,288 A | * | 3/1973 | Weber | 73/382 R |
| 3,962,693 A | * | 6/1976 | Schamblin | 33/366.24 |
| 4,069,591 A | * | 1/1978 | McArthur | 33/366.24 |
| 4,219,940 A | * | 9/1980 | Okubo | 33/366.24 |
| 4,385,519 A | * | 5/1983 | Tokarz | 73/295 |
| 4,401,888 A | * | 8/1983 | West et al. | 33/366.24 |
| 4,987,783 A | * | 1/1991 | D'Antonio et al. | 73/862.626 |
| 5,134,883 A | * | 8/1992 | Shannon | 33/366.24 |
| 5,606,802 A | * | 3/1997 | Ogawa | 33/283 |
| 5,822,658 A | * | 10/1998 | Tanaka et al. | 399/174 |
| 5,917,587 A | * | 6/1999 | Rando | 356/149 |

* cited by examiner

Primary Examiner—Diego Gutierrez
Assistant Examiner—Travis Reis
(74) Attorney, Agent, or Firm—Sidley Austin Brown & Wood, LLP

(57) ABSTRACT

A self-leveling device having a modular unitary suspension (1) for a measurement system carrier (2) of a tiltable housing (3), with the carrier oscillating freely in at least one direction, and the device being distinguished by a flexible connector assembly (5) formed of rubber-like elastic material and situated between two mounting structures (4). The connector assembly is designed as a compact structural component and forms a rotationally symmetrical flexural moment at least in one axial mid region of flexure.

13 Claims, 2 Drawing Sheets

SELF-LEVELING DEVICE

BACKGROUND OF THE INVENTION

The invention relates to a self-leveling device, preferably an optical display device such as a multiple-axis laser, a leveling device or a rotational laser having a suspension for a free-hanging pendulum.

In tiltable devices of this type the pendulum systems, to which this invention is limited, at least one freely hanging, gravity-acting pendulum is used as the measurement system carrier and is guided by gravity.

U.S. Pat. No. 5,459,932 discloses an optical display device characterized by a laser diode that produces a visible laser beam which, together with an optical beam splitter, is mounted on a freely hanging, eddy-current damped pendulum connected by means of a coil spring using a flexible-elastic suspension. The power supply to the laser diode is achieved via at least one freely suspended fine wire. In the event of vibration or shock the coil spring itself executes complex lateral and rotational oscillations around its position of rest because of which additional damping is required in proximity to the suspension.

U.S. Pat. No. 5,917,587 discloses an optical display device in which the prism is fixed using a flexible-elastic and dampening suspension in the form of a rubber strip.

DE19810447A1 discloses as the resilient suspension a flexible foil hinge or a flexible-elastic strip formed of a rubber-like elastic material. The suspension is comprised of a multi-component frame structure with connector pins for conductive contact with the housing or with the measurement system carrier of the pendulum, whereby a prefabricated foil hinge or band is arranged between the individual carrier plates of the frame structure, the foil hinge or band having a strip-like segment and is fastened bilaterally to adjacent mounting segments. The film hinge or strip incorporates circuits or wires for power supply to a laser diode arranged on the pendulum acting as the measurement system carrier. The suspension forms an integral unit which as such can be easily installed or replaced in the housing. Its disadvantage is that it requires two foil hinges or bands to be arranged perpendicular to each other and axially behind each other in the manner of a cardan or universal joint in order to allow free lateral gravity-acting alignment on all sides.

U.S. Pat. No. 5,541,727 discloses the elastic and dampening suspension in an optical projection tool with limited precision as a compact, dumbbell shaped highly elastic component made of rubber that extends radially and projects bilaterally axially through apertures.

SUMMARY OF THE INVENTION

The object of the invention is to achieve a reduction in the dimensions of the arrangement forming the suspension and further, a reduction in the components required for the suspension.

Essentially, a modular unitary suspension for a measurement system carrier of a tiltable housing, the carrier being designed as a gravity-acting pendulum freely oscillating in at least one lateral direction, is characterized by a flexible connection means comprised of a rubber-like elastic material formed as a compact component and having at least in one axial region of flexure a rotationally-symmetrical flexural resistance moment.

Thereby the identical flexural resistance and a comparable torsion resistance is created by the connector assembly via the axial region of flexure in all directions perpendicular to the axis. As a result the components required for the creation of a cardan-like element are eliminated and the arrangement becomes axially reduced in size. The viscoelasticity of the rubber-like elastic material provides a more effective self-dampening effect for the oscillation modes of the connector assembly, whereby no additional dampening of the connector assembly is required.

The connector assembly is advantageously designed to be rotationally symmetrical, dumb-bell shaped, whereby a thin section forms the flexural region and the bilateral cross-sectional thickened sections serve to fasten the connector assembly to their respective mounting assemblies.

The bilateral and axially extending cross-sectional thickened sections each advantageously have radial recesses for interlocking engagement into axial through-holes of the respective mounting assemblies.

The outside axial regions of the cross-sectional thickenings taper inwardly at the ends, whereby they can be forced through the through holes by light axial pressure and there automatically engage into radially projecting catches.

The suspension includes electrical connections extending over the flexible fastening assembly, the electrical connections connecting the measurement system into an electrical circuit in the rest of the housing via at least two conductive current paths.

A further advantage is the fact that the electrical connections are connected to contact surfaces on the mounting assemblies established bilaterally with the connector assembly and over which electrical contact can be made from the housing to the pendulors measurement system carrier.

The electrical connections are advantageously formed as flexible fine wires or stranded wires that suspendedly bridge the connector assembly and further advantageously wrap around its axial mid region in proximity to the oscillation midpoint at least over a half-space.

Alternatively, the electrical connections are lead through the connector assembly that is coaxially hollow at least in the region of flexure and then further are advantageously strain-resistantly connected to the structures for the absorption of axial traction forces.

Further alternatively, at least one electrical connection is arranged coaxially helically around the resilient connector assembly.

Moreover alternatively, several additional electrical connections are advantageously arranged circumferentially equally spaced, radially around the flexible connector assembly, the electrical connections being designed to be helical in shape.

The electrical connections can be further alternatively designed as printed circuits on the surface of the axial midsection of the connector assembly which furthermore advantageously surround the structures helically and further advantageously affords transition to recessed contacts inside of the recesses, the contacts being electrically connectable with the respective contact surfaces of the respective mounting assemblies.

The connector assembly is comprised advantageously of a conductive rubber-like elastic material such as, for example, polyanliline, polypyrol, or an elastomer filled with graphite and/or a conductive carbon, whereby at least one current path of the circuit is designed through the connector assembly itself.

BRIEF DESCRIPTION OF THE DRAWING

The invention is more fully explained using a preferred exemplary embodiment read together with the following figures, wherein.

DETAILED DESCRIPTION OF THE INVENTION

Figure 1:
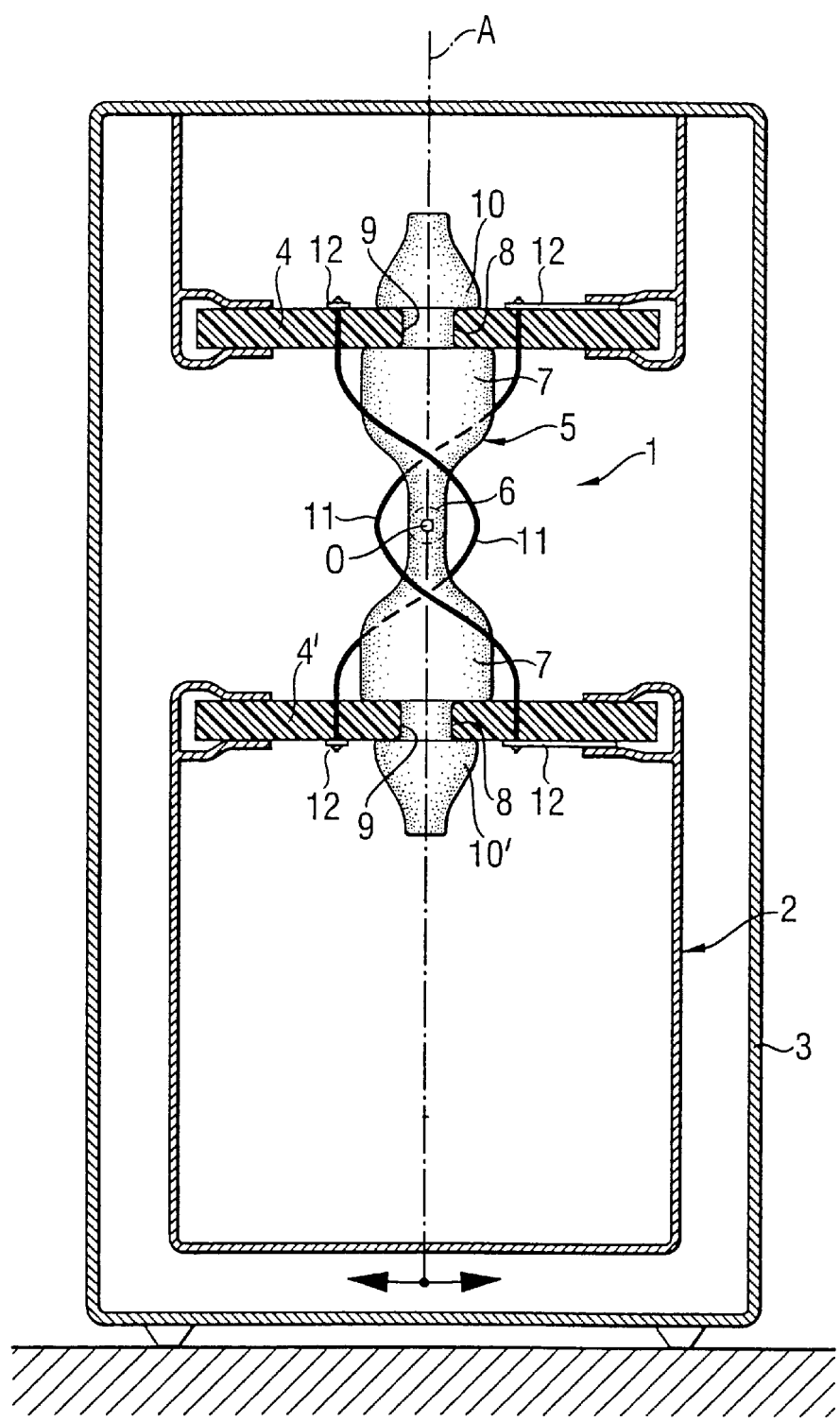
FIG. 1 is a vertically extending view of a self-leveling device, partly in section, with a suspension for a freely hanging pendulum.

In FIG. 1 a suspension 1 is arranged modularly as an integral unit for a measurement system carrier 2 of a multi-axis laser between two mounting assemblies 4, 4', the carrier being in the form of a gravity-acting pendulum freely oscillating in at least one lateral direction. The measurement system carrier is located within a tiltable housing 3, and has a resilient connector assembly 5 comprised of a rubber-like elastic material having a hardness of less than 30 Shore A and formed as a compact, radially symmetrical, dumbbell-shaped component, whereby one approximately 2 mm thin body 6 forms the approximately 8 mm long axial flexural mid region, and bilaterally approximately 5 mm thick thickened sections 7 serve in fastening the connection assembly 5 to the respective mounting structures 4, 4'. The axially bilaterally arranged thickened sections 7 each form radial recesses 8 for the interlocking engagement into axial through-holes 9 of the respective mounting structures 4, 4', whereby the axially outside regions of the sectional thickenings 7 form at their ends inwardly tapered, radially projecting catches 10, 10'. The suspension 1 has two electrical connections 11 extending over the connector assembly 5, the connections being for a current of approximately 100 mA and are connected to contact surfaces 12 at the mounting structures 4, 4' arranged bilaterally to the connector assembly 5 and over which the electrical contact from the device housing 3 to the measurement system carrier 2 is established, the electrical connections 11 are formed as flexible fine wires that suspendedly bridge the connector assembly 5 and wrap around its axial mid region 6 in proximity to the oscillation midpoint O at least over a half-space.

Figure 2:
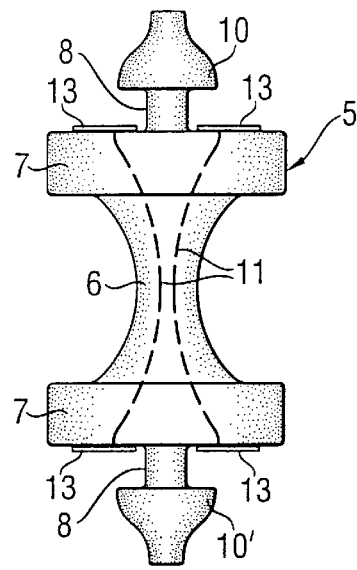
FIG. 2 is a view of a second variant embodiment of the connector assembly of FIG. 1.

In FIG. 2, a second variant embodiment of the connector assembly 5 is shown, the electrical connections 11 are lead through the coaxially hollow body of the flexural mid region 6 and are connected strain-resistantly with the connector assembly 5, whereby the electrical connections 11 at the radially thickened section 7 extend into the recesses 8 and are connected to recessed contacts 13, which after installation form an electrical contact with the respective contact surfaces of the installed mounting assembly 4, 4' (not shown).

Figure 3:
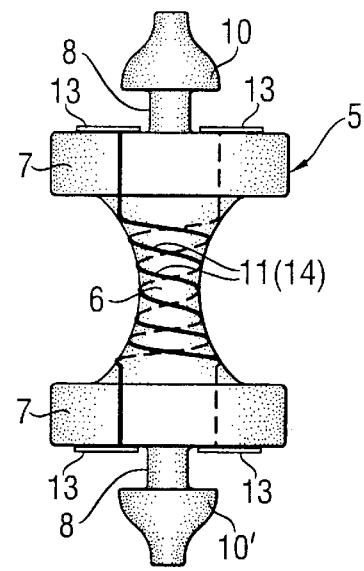
FIG. 3 is a view of a third variant embodiment of the connector assembly of FIG. 1.

Pursuant to FIG. 3, in a third variant embodiment, the electrical connections 11 are formed as thin printed circuits 14 on the axial mid region of the connector assembly 5; the printed circuits wrapping around the connector assembly in a helical fashion and being connected into recessed contacts 13, which can be connected electrically to their respective contact surfaces of the associated assembly structure (not shown).

Figure 4:
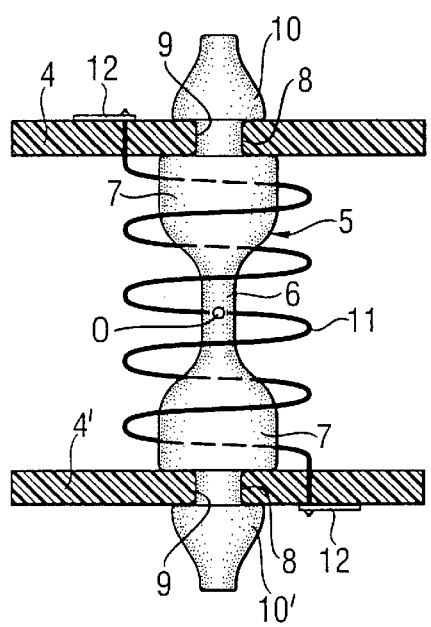
FIG. 4 is a view of a fourth variant embodiment of the connector assembly of FIG. 1.

In FIG. 4, a fourth variant embodiment is shown of an electrical connection and is formed as a flexible braided fine wire and arranged helically, extending coaxially around the resilient connector assembly 5, comprised of conductive elastomers.

Figure 5:
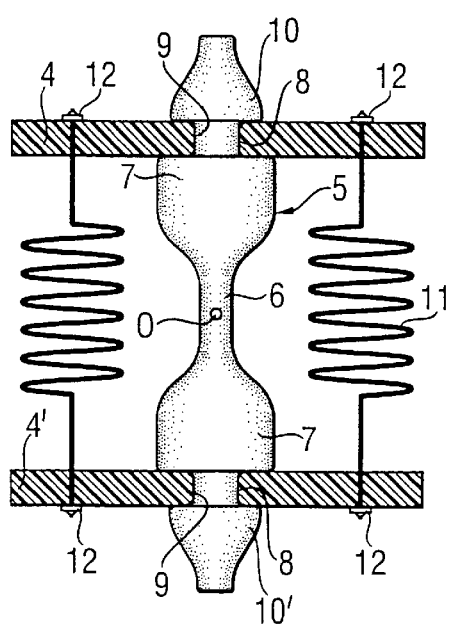
FIG. 5 is a view of a fifth variant embodiment of the connector assembly of FIG. 1.

FIG. 5 is a fifth variant embodiment, with several electrical connections and is comprised of flexible braided fine wires, circumferentially equal, and arranged helically and radially outwardly around the resilient connector assembly,

What is claimed is:

1. A self-leveling device with a modular suspension (1) formed as an integral unit for at least one unidirectionally, freely oscillating measurement system carrier (2) within a tiltable housing (3) said device further comprising an axially extending resilient connector assembly (5) formed of a rubber-like elastic material and constructed as a compact structural component extending axially between two axially spaced mounting structures (4), said connector assembly (15) having at least one rotationally-symmetrical flexural resistance moment in an axial mid region of flexure (6); said axial mid region of flexure comprising an axially extending thin middle region (6) with radially thickened sections (7) connecting said mid region (6) to said mounting structures (4,4'); and one of said mounting structures (4) forming a part of said system carrier (2).

2. A self-leveling device, as set forth in claim 1, wherein said connector assembly (5) is formed rotationally symmetrical and has a circular cross-section in said axial mid region of flexure.

3. A self-leveling device, as set forth in claim 1, wherein said thickened sections (7) each have a radially inwardly directed recesses (8) for interlocking engagement into axial through-holes (9) in said mounting structures.

4. A self-leveling device, as set forth in claim 3, wherein said thickened sections (7) taper inwardly at their axially extending end regions.

5. A self-leveling device, as set forth in claim 1, wherein said suspension (1) has at least one electrical connection (11) extending along said connector assembly.

6. A self-leveling device, as set forth in claim 5, wherein two electrical connections (11) are each connected to a contact surface (12) on said mounting structures (4) spaced laterally outwardly from said connector assembly (5) whereby an electrical contact can be provided between said housing (3) and said measurement system carrier (2).

7. A self-leveling device, as set forth in claim 6, wherein said electrical connections are formed of one of flexible fine wires and flexible braided fine wires which bridge said connector assembly (5) between said mounting structures (4) and extend around said flexural mid region (6) in proximity of an oscillation midpoint (O) over at least over a half-space.

8. A self-leveling device, as set forth in claim 5, wherein two said electrical connections extend through said connector assembly, said connector assembly (5) is hollow in the axial direction at least in the axial mid region of flexural and connected in a strain-resistant manner with said connector assembly for absorbing axial tension and tractive forces.

9. A self-leveling device, as set forth in claim 5, wherein two said electrical connections (11) are formed as printed circuits (14) on the axial mid region (6) of said connector assembly (5); said electrical connection extend helically around connector assembly and end in recessed contacts (13) within recesses (8) in a thickened section (7) of said connector assembly (5) and are electrically connected contact surfaces (12) of said mounting structures (4).

10. A self-leveling device, as set forth in claim 5, wherein said connector assembly is formed of a conductive rubber-like elastic material.

11. A self-leveling device, as set forth in claim 5, wherein said connector assembly is formed of a conductive rubber-like elastic material and at least one current path of said electrical connection is formed by said connector assembly (5).

12. A self-leveling device, as set forth in claim 5, wherein said at least one electrical connection is arranged coaxially with and helically around said connector assembly.

13. A self-leveling device, as set forth in claim 5, wherein a plurality of electrical connections are circumferentially equally distributed extending radially outwardly and helically around said connector assembly (5).

* * * * *